Jan. 10, 1933.  P. E. FAGERHOLM  1,893,542
BOMB SIGHT
Filed March 21, 1927   2 Sheets-Sheet 1
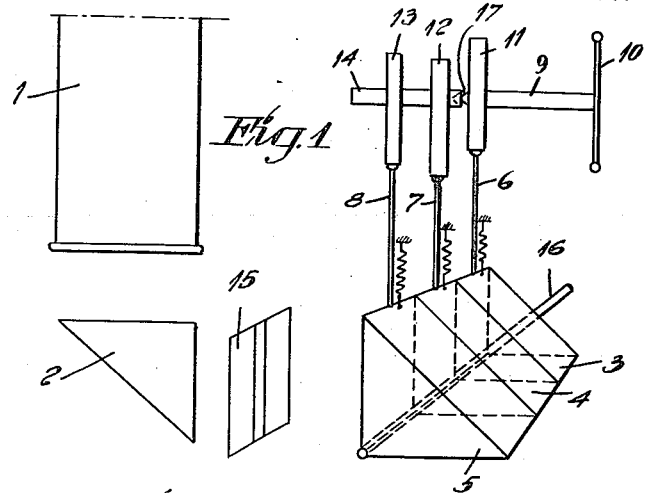
Fig.1
Fig.2
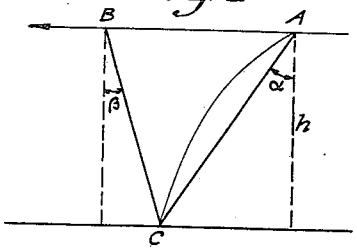
Fig.3
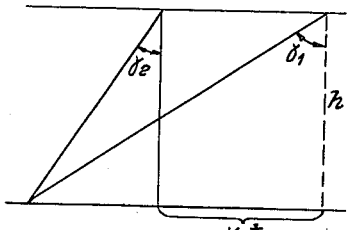
Fig.4
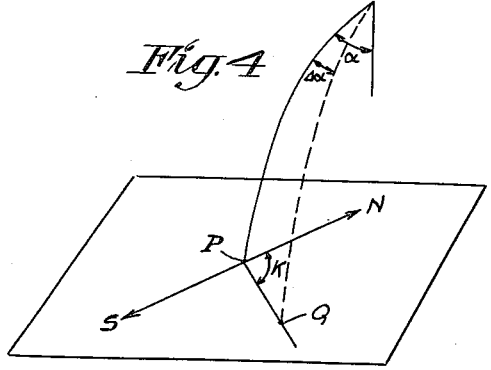
Fig.5
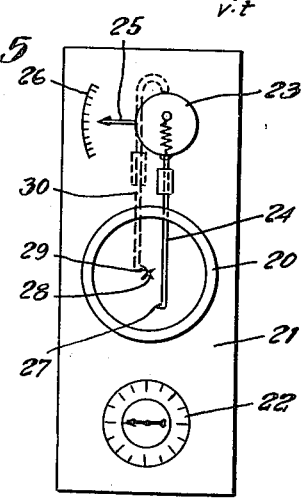
Per Erik Fagerholm
INVENTOR
By Marks & Clerk
Attys

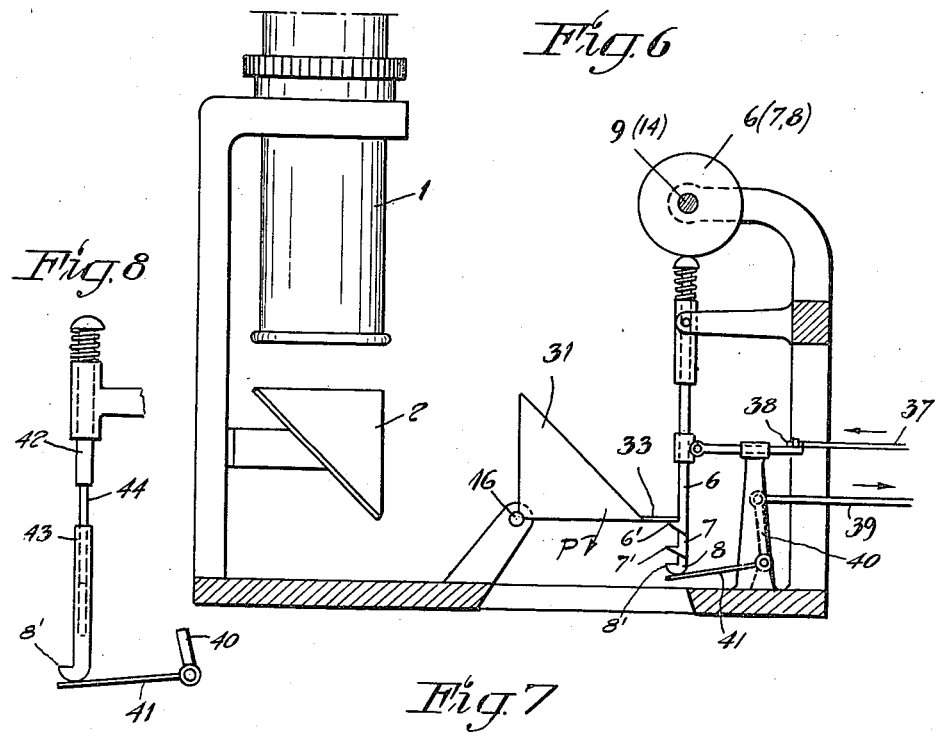
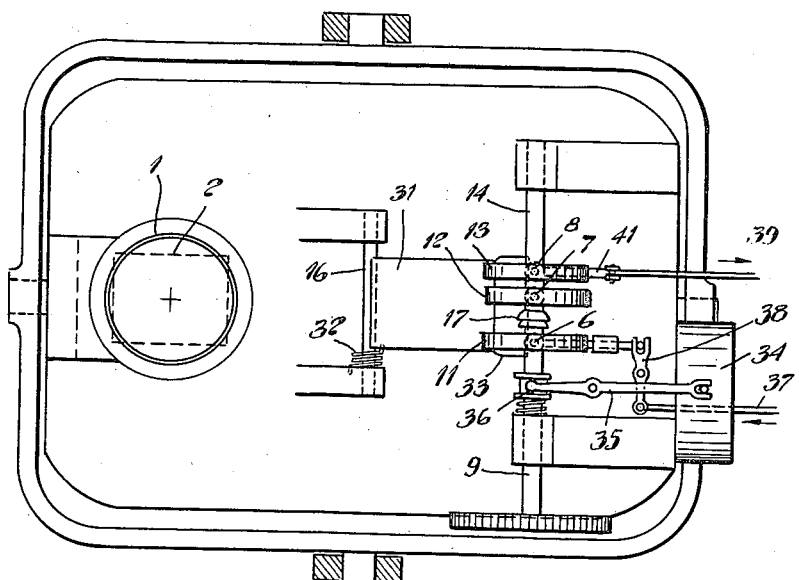

Patented Jan. 10, 1933

1,893,542

UNITED STATES PATENT OFFICE

PER ERIK FAGERHOLM, OF STOCKHOLM, SWEDEN, ASSIGNOR TO FAGERHOLM CALCULATORS, LIMITED, OF LONDON, ENGLAND

BOMB SIGHT

Application filed March 21, 1927, Serial No. 177,120, and in Sweden March 27, 1926.

Bomb sights are previously known, which comprise a telescope directed vertically downwards and rotatable about its vertical axis, and a prism arranged in front of the objective, said prism being adapted to be adjusted into different angular positions according to the value of the forward aiming angle. This angle is dependent, among other things, on the speed of the aircraft over the ground. Arrangements in bomb sights are also known, which serve to determine this speed by measuring the time required by an object on the ground to move from one mark to another in the field of view of the telescope, or from one position of the prism to another respectively. These constructions have never been entirely satisfactory, inasmuch as the adjustment of the prism or the measuring of the time cannot take place automatically. Moreover, in the known constructions due regard to the influence of the wind on the bomb, after it has left the aircraft, can be taken only approximately and with the aid of auxiliary tables. As a rule, tables have also been required for the calculation of the forward aiming angle.

The present invention aims at removing all of the drawbacks present in the constructions heretofore known, and has for its object to provide a bomb sight, in which due regard to all circumstances influencing the curve of fall of the bomb can be taken in a simpler and more automatic manner.

The invention is illustrated in the accompanying drawings in which:

Fig. 1 shows diagrammatically an embodiment of the invention.

Fig. 2 illustrates how the throwing angle and the burst observing angle are obtained.

Fig. 3 illustrates how the values for the turning angle of the hand wheel, which correspond to the beginning and the end respectively of the measuring operation, are obtained.

Fig. 4 illustrates how the curve of fall of the bomb is influenced by the wind.

Fig. 5 illustrates how correction is made for certain values.

Fig. 6 is an elevation, partly in section, of the second embodiment of the invention. Fig. 7 is a plan view and Fig. 8 a detail of said embodiment.

Arranged underneath the telescope of the bomb sight is a prism 2 and laterally of the same, approximately at the same level as said prism 2, there are three other prisms 3, 4 and 5, which for reasons to be understood later on will be called the measuring prism, the throwing prism and the bursting prism. These three prisms are mounted on a shaft 16, so that they may be rotated independently of one another. Attached to each of the prisms 3, 4, 5 is an arm, i. e. the measuring arm 6, the throwing arm 7 and the bursting arm 8 respectively, which arms bear each against a cam disk, for instance by means of sliding rolls, said cam disks being the measuring cam 11, the throwing cam 12 and the bursting cam 13, with which cams the arms are kept in constant engagement, for example by means of springs attached to the prisms. The measuring cam 11 is secured on a shaft 9 provided with a hand wheel 10, and the two other cam disks 12 and 13 are attached to a shaft 14 forming an extension of the shaft 9, with which the said shaft 14 may be coupled by means of a coupling 17. Arranged between the group of prisms 3, 4, 5 and the prism 2 is a shutter 15 which is displaceable in such a manner as to permit of being brought opposite any one of the prisms 3, 4 and 5, so that only one of these prisms admits light to the telescope 1.

The telescope 1 is rotatably mounted about its vertical axis, and is provided with a haircross.

In the following, some theoretical principles will first be set forth to explain the invention.

If, to begin with, that case is considered, where the influence of the wind on the path of the bomb, after the latter has left the aircraft, may be neglected, and if it is supposed that the bomb is dropped, as shown in Fig. 2, when the aircraft is at the point A, while the point of fall is at C, when the aircraft has travelled the distance AB, the following is obtained:

$$\alpha = f(h, v, \text{type of bomb}) \quad \ldots \quad (1)$$
$$\beta = f_1(h, v, \text{type of bomb}) \quad \ldots \quad (2)$$

where $h$ designates the altitude of the aircraft above the ground or the water respectively, while $v$ designates the speed of the aircraft relatively to the ground or the water respectively. In the following the angles $\alpha$ and $\beta$ are to be called the throwing angle and the bursting angle respectively. Thus these angles are functions of $h$, $v$ and of the type of bomb used.

In the first place, the speed of the aircraft relatively to the ground or the water, i. e. $v$, is to be determined. This is effected in the following manner: The shutter 15 is adjusted in such a manner that the prism 3 admits light to the telescope 1 which is provided with a hair cross, at least one thread of which is a long thread. By turning the telescope, the same is adjusted in such a manner, that objects on the ground or the surface of the water move along the long thread of the hair cross or in parallel thereto respectively. Just when the object passes the hair-cross, the observer engages the coupling 17 so that the shafts 9 and 14 are coupled together, a releasing watch (not shown) being then automatically set in motion at the same time. The observer maintains the object in the hair-cross by turning the measuring prism 3 through the medium of the hand wheel 10, the measuring cam disk 11 and the measuring arm 6. While the measuring prism 3 is turned round, the throwing prism and the bursting prism 5 obviously are turned at the same time through the medium of the respective cam discs and arms. After the lapse of a certain time, for example 10 seconds, the coupling 17 is released. The prisms 4 and 5 are now adjusted for the throwing or bursting angle which corresponds to the speed of the aircraft relatively to the ground or the water. This will appear from the following explanation:

According to Fig. 3

$$v(t) = h(\text{tangent } \gamma_1 - \text{tangent } \gamma_2) \quad (3)$$

where $v$ designates, as before, the speed of the aircraft relatively to the ground or the water respectively, $t$ the time, $h$ the height, $\gamma_1$ the sighting angle to the object at the beginning of the above determination and $\gamma_2$ the sighting angle to the object at the end of the same. Now if the measuring cam disk 11 is shaped according to the formula $$\delta = k(\text{tangent } \gamma)$$ where $\delta$ designates the turning angle of the hand wheel from the position in which the prism 3 occupies such a position that the object situated perpendicularly underneath the aircraft is visible in the hair-cross of the telescope, $k$ a constant and $\gamma$ the change in the sighting angle then, if $\delta_1$ and $\delta_2$ are the values for $\delta$ which correspond to the beginning and the end respectively of the measuring operation, that is to say after 10 seconds, the following formulæ are obtained:

$$\delta_1 = k \text{ (tangent } \gamma_1)$$
$$\delta_2 = k \text{ (tangent } \gamma_2)$$
$$\therefore \delta_1 - \delta_2 = \Delta\delta = k \text{ (tangent } \gamma_1 - \text{tangent } \gamma_2)$$
$$\therefore \text{tangent } \gamma_1 - \text{tangent } \gamma_2 = \frac{\Delta\delta}{k}$$

If this value is inserted into the equation (3) then $$v(t) = h \frac{(\Delta\delta)}{k}$$

$$v = h \frac{(\Delta\delta)}{k(t)} = k_1(\Delta\delta)(h) \quad (4)$$

where $k_1$ is a constant.

If this value for $v$ is inserted into the equations (1) and (2), then $$\alpha = f(h, \Delta\delta, \text{type of bomb})$$
$$\beta = f_1(h, \Delta\delta, \text{type of bomb}).$$

The throwing cam disk 12 and the bursting cam disk 13 are adapted to a certain definite altitude and to a certain type of bomb. In order to enable dropping of the bomb at different altitudes, it is thus found to be necessary to provide a plurality of such cam disks. It is also possible, where the altitude has been determined, to secure to the shaft 14 a throwing cam disk or a bursting cam disk respectively corresponding to this altitude. The throwing cam disk and the bursting cam disk being thus adapted beforehand, the throwing angle $\alpha$ and the bursting angle $\beta$ will thus only be functions of $\Delta\delta$.

After the adjustment above described has been effected for the speed of the aircraft over the ground or the water respectively, the shutter 15 is displaced in such a manner that the throwing prism 4 will admit light to the telescope 1. When the object which it is desired to hit becomes visible in the hair-cross of the telescope, the device retaining the bomb at the aircraft is released. The shutter 15 is then displaced in such a manner that the bursting prism admits light to the telescope 1, and the bursting taking place when the bomb hits the ground is observed through this prism. If bursting does not take place so as to be visible in the haircross, this depends on the influence of the wind on the bomb after the latter has left the aircraft. The manner of effecting the correction for the influence of the wind will be described in the following:

Fig. 4 illustrates how the curve of fall of the bomb is influenced by the wind. If the influence of the wind is neglected, the bomb would strike the ground at the point P, with an angle of fall $\alpha$, while in reality the point of fall coincides with point Q. The deviation is a vector, the direction of which is given by the angle K, which the connecting line between points P and Q forms with the north-south direction, and the value of which is measured by the angle $\Delta\alpha$ under which it is visible from the aircraft. These ballistic quantities may be obtained on every particular occasion by meteorological observations. Both are, on a certain occasion, functions only of the altitude of the aircraft above the ground or water respectively, and of the type of bomb used.

How the correction is made for these values appears from Fig. 5. Rotatably arranged about the telescope 1 by means of a ring 20 is a plate 21 which carries, first, a compass 22, and, second, a cam disk 23 having a longitudinally displaceable arm 24 bearing thereagainst, said arm 24 being provided at its end with a mark 27 which is visible in the field of view of the telescope. Attached to the cam disk 23 is an arm 25 pointing to a scale 26 graduated in such a manner that for each adjustment of the cam disk 23 that angular value $\Delta\alpha$ can be read off from the same which corresponds to the distance of the mark 27 from the hair-cross 28 situated in the axis of the telescope.

The compass 22 is provided with a graduation located on the plate 21 so as to give a zero reading at the one end of the needle, when the connecting line between the hair-cross 28 and the mark 27 coincides with the north-south direction. If the ballistic values K and $\Delta\alpha$ have been determined by meteorological observations for the type of bomb used, then the aeronaut has obtained results in the form of a table with the altitude as a basis. Off the table he then takes the values for K and $\Delta\alpha$ which correspond to the altitude from which he wants to drop the bomb, and adjusts K on the compass by turning the plate 21 and $\Delta\alpha$ on the scale 26 by turning the cam disk 23 by means of the arm 25. The mark 27 then indicates the point in which, after the throwing prism has, in the manner hereinbefore described, been brought to assume the position corresponding to the speed, the target is to be visible when the bomb is dropped. The explosion will then be visible in the hair-cross 28.

In order to avoid, during the flight, the use of a special table for the ballistic quantities K and $\Delta\alpha$, the scale 26 and the compass 22 are preferably provided with a writing surface, on which, prior to the beginning of the flight, there are marked off for each altitude corresponding positions of the pointer 25 or the compass needle respectively.

If the ballistic quantities K and $\Delta\alpha$ are not known from meteorological observations, said quantities may be determined by dropping a trial bomb. To begin with, the case is considered where the trial bomb is of the same type as the operating bomb. The throwing and bursting prisms are adjusted as before, the trial bomb is thrown and the bursting at the point of fall observed through the bursting prism. If the bursting is visible in the hair-cross, then $\Delta\alpha$ is equal to zero. If, on the other hand, the explosion is not visible in the hair-cross, the angular distance from the point of bursting to the hair-cross is equal to $\Delta\alpha$, while the bearing is equal to K. By turning the plate 21 and the cam disk 23, the mark 27 is brought to the point in the field of view where bursting took place. This is facilitated by a readily movable mark in the field of view, through which the position of bursting is fixed. The quantity $\Delta\alpha$ is then read off the scale 26, while the quantity K, increased by 180°, is read off the compass 22. The values for K and $\Delta\alpha$ thus found are then used in dropping the bomb from this altitude, not only by the aircraft from which the trial bomb was dropped, but also by the other aircraft of the squadron, and this holds good independently of the direction in which the different aircraft are flying. For the aircraft from which the trial drop was made, and the mark 27 of which was adjusted in the point of bursting, it is only required that the plate 21 be turned 180°.

If the trial drop takes place with an auxiliary bomb of some other type, which is generally lighter than the operating bombs, then the quantity K is the same for the two bombs, with a sufficient degree of accuracy, while the quantity $\Delta\alpha$ for the operating bomb may be taken as proportional to the same quantity for the auxiliary bomb. The value for $\Delta\alpha$ which is obtained from the trial throw is thus to be multiplied by a constant in order to hold good for the operating bomb. This multiplication may be avoided by providing the arrangement shown in Fig. 5 with a further mark 29 attached to an arm 30 parallel to the arm 24 and bearing at its other end against a portion of the cam disk 23 so formed that the distance from the hair-cross 28 to the mark 27 is always equal to the constant dependent on the type of bomb times the distance from the hair-cross 28 to the mark 29. If the mark 29 is adjusted in the point of bursting, then the mark 27 automatically assumes the proper position, and the ballistic quantities $\Delta\alpha$ and K are directly read off the scale 26 and the compass 22 respectively.

It should be observed that when the auxiliary bomb is to serve only for an empirical determination of the ballistic quantities Δα and K, the dropping of the auxiliary bomb can take place at any time, that is to say, it is not necessary to watch that a certain object is visible in the hair-cross at the moment of dropping the bomb, which is of great importance in certain cases, for instance in flying over water.

If an auxiliary bomb is used to determine the ballistic quantities Δα and K, a bursting cam disk must be used in observing the point of fall of the auxiliary bomb which cam disk is adapted after the type of auxiliary bomb used. When the operating bombs are then to be dropped, this bursting cam disk must be replaced by another disk corresponding to the type of the operating bombs employed, the once made adjustment of the bursting prism for the speed of the aircraft over the ground being then maintained, however.

As it is of fundamental importance that the axis of the telescope is always vertical, independently of the changes in inclination to which the aircraft is subjected, for instance on a varying load, the telescope should be mounted in a Cardan joint, its vertical adjustment being then preferably controlled by a round-spirit level, the image of which is reflected in the field of view of the telescope.

Obviously, the present invention is not limited to the diagrammatic embodiments shown in the accompanying drawings.

The three prisms 3, 4 and 5 may be united into one, which first serves as a measuring prism, the cam disks 12 and 13 then adjusting stopping devices by means of the arms 7 and 8, which stopping devices determine the position of the common prism in the dropping and bursting position respectively. The shutter 15 is then omitted, and its displacements are replaced by means moving the prism to the proper stopping device. By this arrangement, the advantage is gained that the whole light power of the telescope is utilized both in the measuring operation and in dropping the bomb as well as in the observation of the bursting.

An example of such an arrangement is illustrated in Figs. 6–8.

The combined prism 31 provided with an abutting plate 33 is actuated by a spring 32 tending to turn the prism in the direction of the arrow P. The lower end of the arms 6, 7 and 8 respectively is formed as a stopping abutment 6', 7' and 8' respectively intended to serve as an abutment for the plate 33 and thus fix the angular positions to be assumed by the prism. The mode of operation is as follows: When the time for measuring the speed of the aircraft, for instance 10 seconds, has lapsed, the coupling 17 is disengaged by the releasing watch 34 through the medium of the arm 35 and the claw coupling 36. The stopping abutments 7' and 8' will then, as described hereinbefore, assume the positions corresponding to the throwing or bursting angle of the prism 31. Now, when the bomb is unsecured, the rod 37 is actuated in the direction of the arrow, the stopping abutment 6' being then disengaged from the abutting plate 33 through the medium of the arm 38, the said abutting plate being then brought into engagement with the stopping abutment 7' of the throwing arm under the influence of the spring 32. When the target has come within the hair-cross of the telescope, the means holding the bomb at the aircraft is released, the rod 39 being then actuated in the direction of the arrow. The rod 39 actuates the bell crank lever 40, 41, the one arm of which 41, which preferably consists of a leaf spring, actuates the bursting arm 8. When the prism 31 is to assume the bursting position from the throwing position, it must always be turned in a direction opposite to that indicated by the arrow and, consequently, the stopping abutment 8' on the bursting arm must be moved from an initial position underneath the stopping abutment 7' into a position above the same.

For this reason, the bursting arm is preferably made in two parts as shown in Fig. 8, the total length of said parts 42 and 43 determining the bursting position of the stopping abutment 8'.

Extending from the part 42 is a stud 44 which enters into and guides the part 43, the parts 42 and 43 being then preferably kept apart by means of a spring. In the inoperative position, the parts 42 and 43 occupy the relative positions shown in Fig. 8, while in the operative position, that is to say when the retaining means of the bomb has been released, they are pressed against one another by the resilient arm 41.

What I claim is:—

1. In a bomb sighting device for aircraft, the combination of a vertical telescope rotatable about its axis, means for determining the speed of the aircraft in relation to the ground comprising a movably mounted speed reflector cooperating with the said telescope, adjusting means for operating the said speed reflector so as to enable by its movement an object to be retained in the field of view of the telescope during the flight of the aircraft, a movably mounted throwing angle reflector for determining the throwing angle, and coupling means adapted to couple the said throwing angle reflector to the aforesaid adjusting means in such a way that the movement of the said adjusting means during the determination of the speed of the aircraft will cause the throwing angle reflector to be moved into the position for determining the throwing angle.

2. In a bomb sighting device for aircraft, the combination of a vertical telescope rotatable about its axis, means for determining the speed of the aircraft in relation to the ground comprising a movably mounted speed reflector cooperating with the said telescope, adjusting means for operating the said speed reflector so as to enable by its movement an object to be retained in the field of view of the telescope during the flight of the aircraft, a movably mounted throwing angle reflector for determining the throwing angle, and coupling means for coupling the said throwing angle reflector to the aforesaid adjusting means including an actuating cam cooperating with the said throwing angle reflector and a clutch for coupling the said cam to the said adjusting means, said cam being so formed that the movement of the said adjusting means during the determination of the speed of the aircraft will cause the throwing angle reflector to be moved into the position for determining the throwing angle.

3. In a bomb sighting device for aircraft, the combination of a vertical telescope rotatable about its axis, means for determining the speed of the aircraft in relation to the ground comprising a movably mounted speed reflector cooperating with the said telescope, adjusting means for operating the said speed reflector so as to enable by its movement an object to be retained in the field of view of the telescope during the flight of the aircraft, a movably mounted throwing angle reflector for determining the throwing angle, a movably mounted bursting angle reflector for determining the bursting angle, and coupling means adapted to couple the said throwing angle and bursting angle reflectors to the aforesaid adjusting means in such manner that the movement of the said adjusting means during the determination of the speed of the aircraft will cause the throwing angle and the bursting angle reflectors to be moved into the positions for determining the throwing and the bursting angles respectively.

4. In a bomb sighting device for aircraft, the combination of a vertical telescope rotatable about its axis, means for determining the speed of the aircraft in relation to the ground comprising a movably mounted speed reflector cooperating with the said telescope, adjusting means for operating the said speed reflector so as to enable by its movement an object to be retained in the field of view of the telescope during the flight of the aircraft, a movably mounted throwing angle reflector for determining the throwing angle, a movably mounted bursting angle reflector for determining the bursting angle, and coupling means for coupling the said throwing angle and bursting angle reflectors to the aforesaid adjusting means including actuating cams cooperating with said throwing angle and bursting angle reflectors respectively and a clutch for coupling said cams to said adjusting means, said cams being so formed that the movement of the said adjusting means during the determination of the speed of the aircraft will cause the throwing angle and the bursting angle reflectors to be moved into the positions for determining the throwing and the bursting angles respectively.

In testimony whereof I affix my signature.

PER ERIK FAGERHOLM.